United States Patent [19]
Karczmer

[11] Patent Number: 4,731,148
[45] Date of Patent: Mar. 15, 1988

[54] TAPE SPLICING BLOCK ASSEMBLY

[76] Inventor: Claude M. Karczmer, 182-25 Tudor Rd., Jamaica Estates, N.Y. 11432

[21] Appl. No.: 939,745

[22] Filed: Dec. 9, 1986

[51] Int. Cl.$^4$ .................. B65H 69/06; G03D 15/04
[52] U.S. Cl. .................................. 156/502; 156/159; 156/304.3; 156/506
[58] Field of Search .............. 156/157, 159, 304.3, 156/304.1, 502, 505, 506

[56] References Cited

U.S. PATENT DOCUMENTS

| | | | |
|---|---|---|---|
| 1,209,339 | 12/1916 | Schippers . | |
| 2,468,629 | 4/1949 | Herzig et al. | 156/157 |
| 2,473,160 | 6/1949 | Madrigal . | |
| 3,318,754 | 5/1967 | Philippi | 156/505 |
| 3,634,171 | 1/1972 | Rosborough, Jr. et al. | 156/506 |
| 3,642,555 | 2/1972 | Nagoshi et al. | 156/502 |
| 3,709,079 | 1/1973 | Wurker | 156/159 |
| 3,764,440 | 10/1973 | Schroter et al. | 156/505 |
| 4,264,065 | 4/1981 | Hanke | 156/157 |

Primary Examiner—Michael Wityshyn
Attorney, Agent, or Firm—Bacon & Thomas

[57] ABSTRACT

A tape splicing block assembly including a block member provided with a flat bed surface sized for supporting a length of magnetic tape that is clamped thereto by a pair of releasable clamp members having inwardly directed longitudinal lips which engage narrow regions of the tape edges along the length of the bed surface.

8 Claims, 13 Drawing Figures

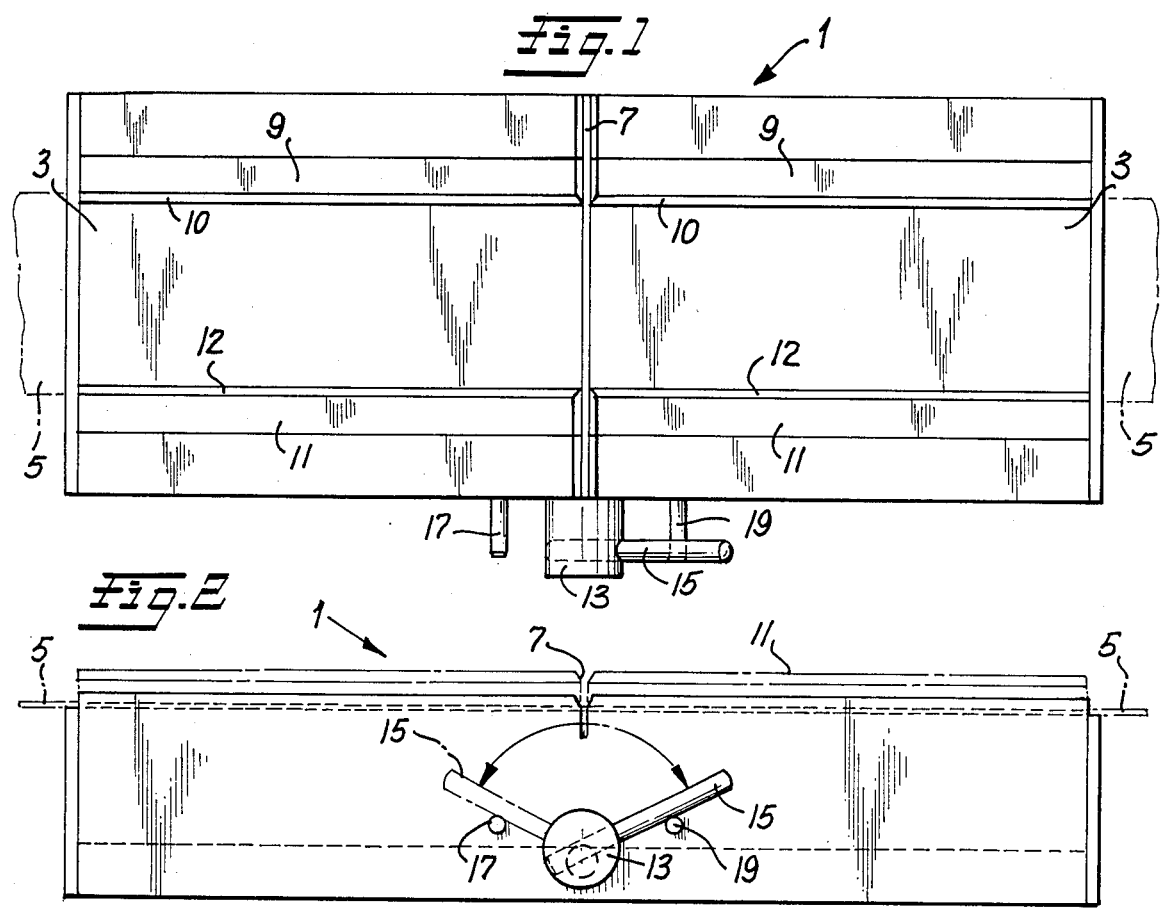
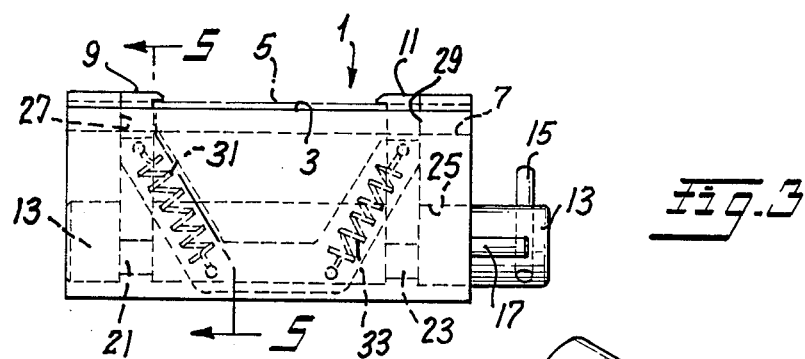
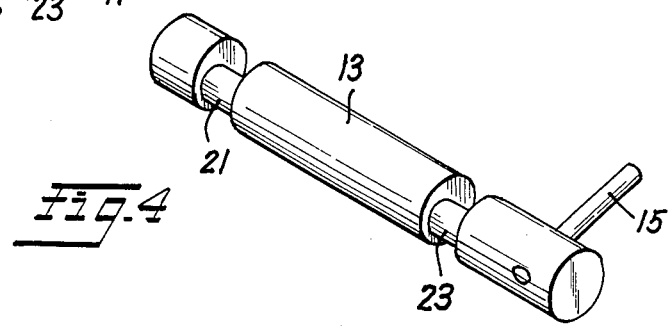

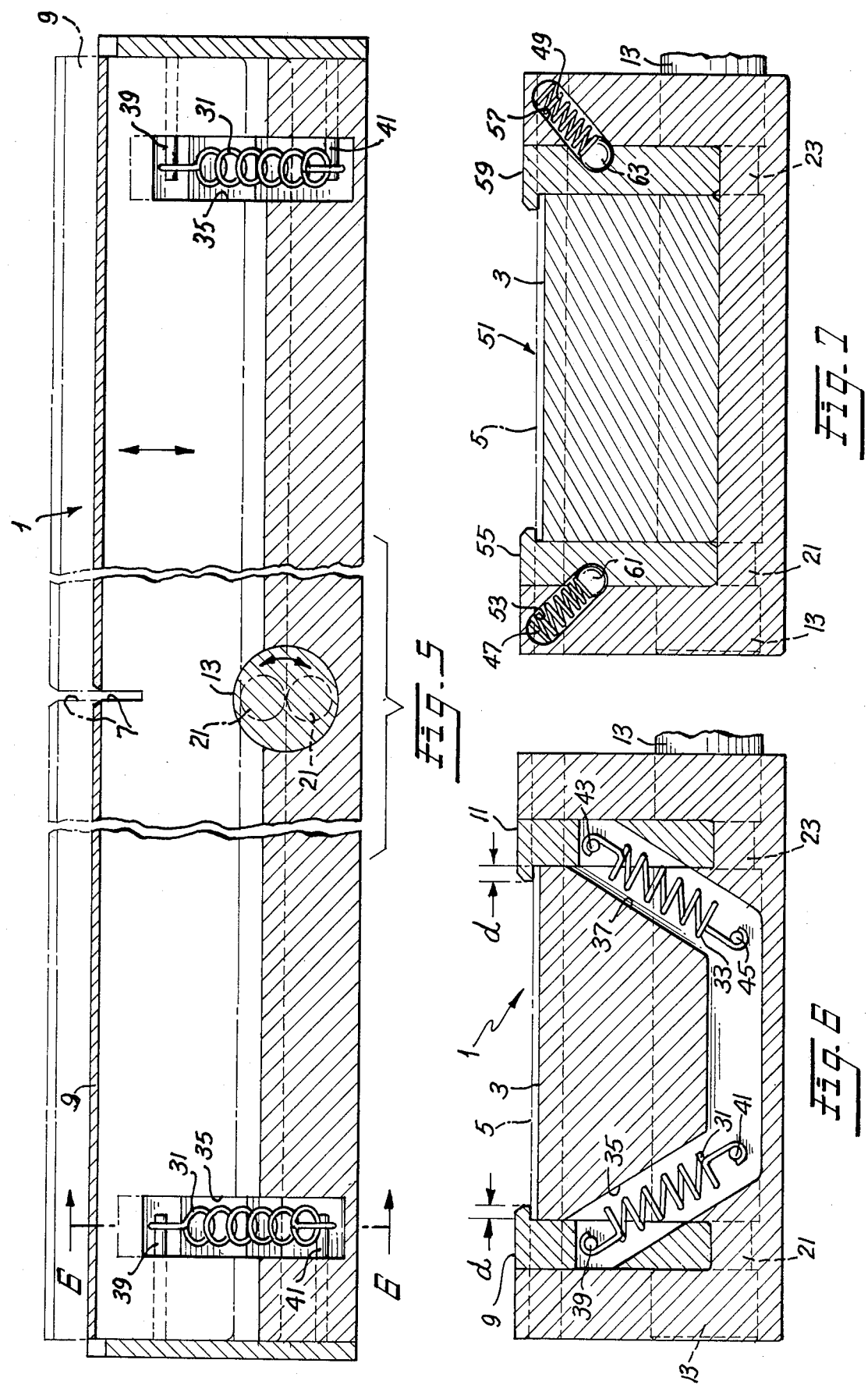

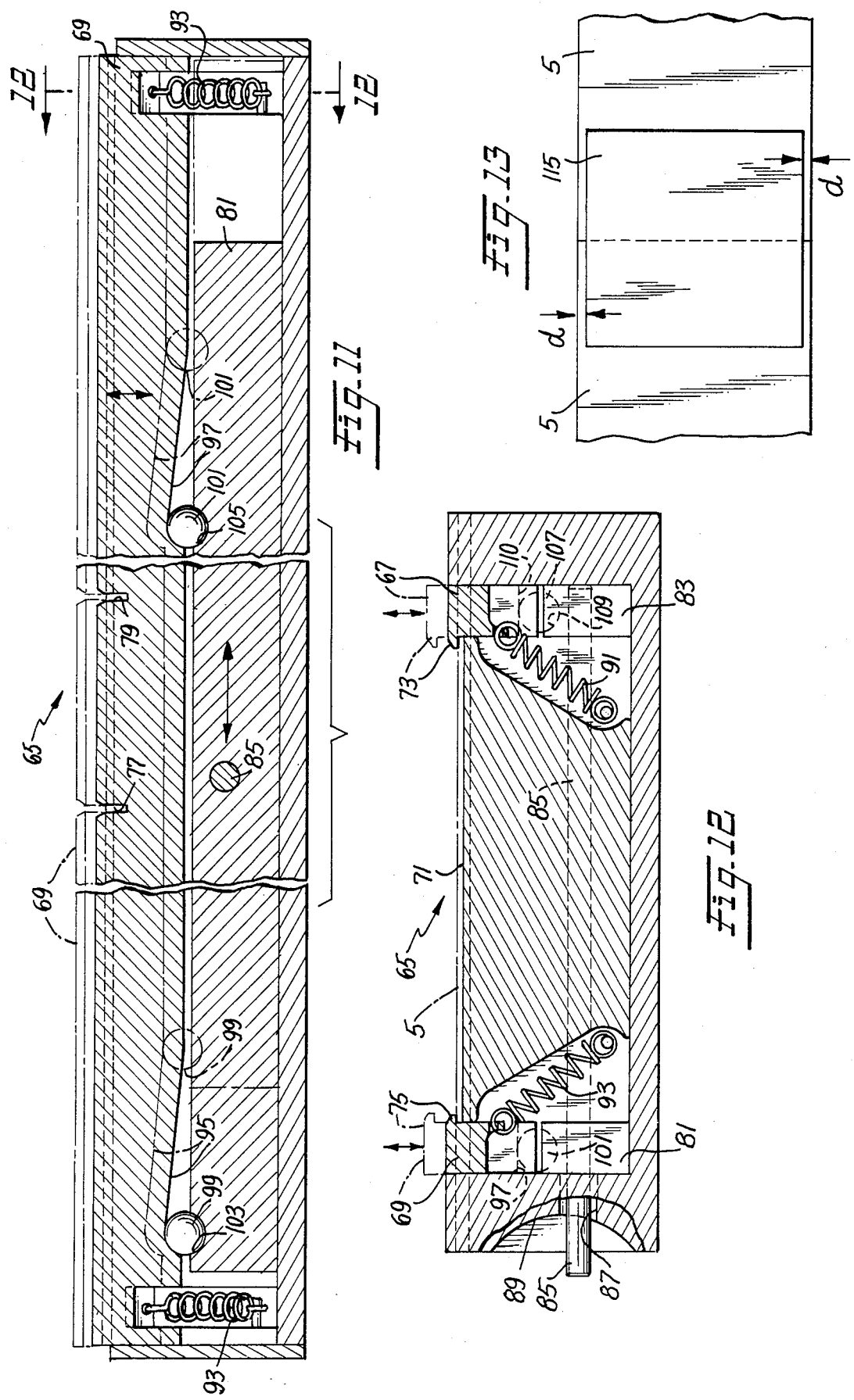

TAPE SPLICING BLOCK ASSEMBLY

BACKGROUND OF THE INVENTION

1. Field of the Invention

The present invention generally involves the field of technology pertaining to devices for splicing lengths of film or tape together. More specifically, the invention relates to an improved tape splicing block that is particularly useful for splicing thin magnetic tape.

2. Description of the Prior Art

Devices for cutting and splicing film and tape are well known in the art. Such a device may take the form of a tape splicing block having a ged or trough on which the tape is supported for cutting and splicing. The tape is secured against the bed by means of clamps or holding fingers so that a splicing tab may be applied to form the spliced joint.

The splicing of very thin magnetic tape, such as tape utilized for video and digital recordings, presents certain problems. A known splicing block for this type of tape is provided with a curved bed or trough. However, this configuration tends to impart a corresponding curvature to the tape at the point of the splice due to the 'fixing' of the tape to the bed during application of the splicing tab. This results in a memorized curvature of the spliced tape which can cause read-write errors, particularly during scanning by a rotating head, and also when the tape is very thin and transported under light tension. The use of a splicing block having a flat bed can avoid this curvature problem, but conventional clamps or holding fingers for securing the tape to the block are inadequate since they must be set back from the cutting and splicing area to provide access thereto. Moreover, such clamping means are unable to prevent thin tape from moving due to static attraction of the tape to other objects, including the splicing tab being applied to form the spliced joint.

SUMMARY OF THE INVENTION

It is an object of the present invention to provide an improved splicing block for splicing lengths of tape, film or the like.

It is another object of the invention to provide an improved splicing block whereby very thin magnetic tape may be easily accessed and precisely spliced.

It is a further object of the invention to provide an improved tape splicing block which securely clamps the tape to the surface of the block bed and does not impart any undesirable physical characteristics to the spliced tape.

These and other objects of the invention are realized by providing a tape splicing block assembly which is essentially defined by a block member provided with a flat bed or trough sized for supporting a length of tape thereon. A pair of releasable clamp members are disposed on opposite sides of the bed surface and provided with inwardly extending longitudinal lips which grip narrow regions of the tape edges against the bed surface. The lips extend for substantially the entire length of the bed surface and inwardly for a distance of approximately 0.015 to 0.020 inch, thereby providing full access to the area of the tape being spliced. The clamp members are spring biased to exert a clamping force in both downward and inward directions against the tape edges, thereby securely clamping the entire length of the tape edges against the bed surface and preventing lifting of the tape from any point on the bed surface. Engagement and disengagement of the clamp members is realized through manual actuation of a cam member.

Other objects, features and advantages of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 1 is a top plan view of a tape splicing block assembly in accordance with a first embodiment of the invention, with a length of tape being engaged thereby and shown in phantom lines;

FIG. 2 is a front elevational view of the block assembly of FIG. 1;

FIG. 3 is an end view as seen from the left end of FIG. 2;

FIG. 4 is an isometric view of a cam member utilized by the block assembly of FIG. 1 for engaging and disengaging the clamp members;

FIG. 5 is an enlarged fragmentary vertical sectional view, taken on the staggered line 5—5 of FIG. 3;

FIG. 6 is a transverse vertical sectional view, taken on the line 6—6 of FIG. 6;

FIG. 7 is a view similar to FIG. 6, depicting a second embodiment of the invention;

FIG. 11 is an enlarged longitudinal fragmentary vertical sectional view, taken on the line 11—11 of FIG. 8, the disengaged position of the clamp members being shown in phantom lines;

FIG. 12 is a transverse vertical sectional view, taken on the line 12—12 of FIG. 11; and FIG. 13 is a fragmentary plan view of a tape spliced by the invention, showing the splicing tab set inwardly from the longitudinal edges of the tape.

DETAILED DESCRIPTION OF THE PREFERRED EMBODIMENTS

Figure 8:
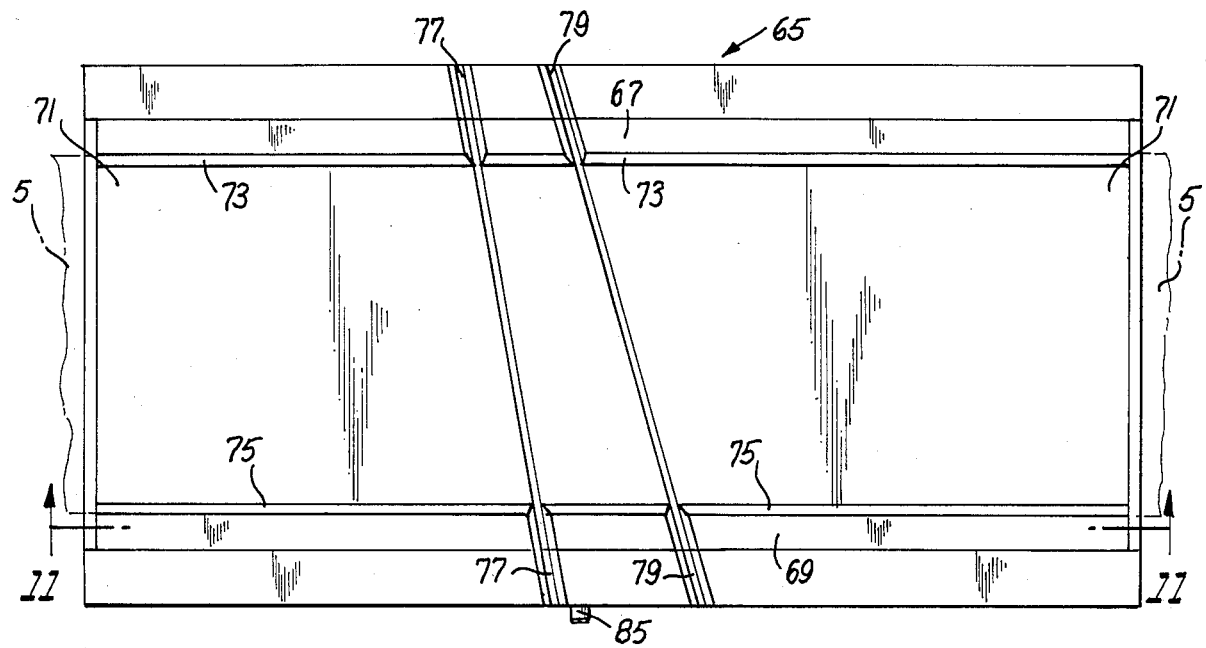
FIG. 8 is a top plan view of a third embodiment of the invention.

A splicing block assembly 1, according to a first embodiment of the invention, shall be described with initial reference to FIGS. 1 and 2. As shown therein, block assembly 1 is of substantially rectangular configuration and includes a longitudinal flat bed surface 3 sized to the width of a length of tape 5 supported thereon. Block assembly 1 is also provided with a transverse cutting slit 7 through which a conventional cutting means (not shown) may be inserted for making the required transverse cut through tape 5. A pair of clamp members 9 and 11 are carried by block assembly 1 on either side of bed surface 3 and include a pair of clamping lips 10 and 12 which extend longitudinally for substantially the entire length of bed surface 3. As shown in FIG. 2, slit 7 extends downwardly through both bed surface 3 and clamp members 9 and 11 in order to permit the full cutting of tape 5.

A rotatable cam member 13 is transversely mounted through block assembly 1 for the purpose of raising and lowering clamp members 9 and 11. Cam member 13 includes a lever 15 for manually rotating cam member 13 between two positions indicated by a pair of opposed stops 17 and 19. As seen in FIG. 2, when lever 15 engages stop 17, clamp members 9 and 11 are caused to be disposed in their raised position of disengagement, thereby permitting the insertion and removal of tape 5 with respect to bed surface 3. When cam member 13 is rotated in the opposite direction to dispose lever 15 against stop 19, clamp members 9 and 11 are caused to be brought downwardly into engagement against tape 5 and clamp same securely to bed surface 3.

The details of cam member 13 and the manner in which engagement and disengagement of clamp members 9 and 11 is accomplished shall now be described with particular reference to FIGS. 3 and 4. Cam member 13 is essentially in the form of a cylindrical shaft provided with a pair of reduced diameter cylindrical sections 21 and 23, the longitudinal axes of which are coaxial with each other but eccentrically offset from the longitudinal axis of cam member 13. As seen in FIG. 3, can member 13 is rotatably journaled through a cylindrical bore 25 extending transversely through block assembly 1. Clamp member 9 and 11 are disposed within correspondingly shaped slots 27 and 29 formed in block assembly 1, whereby the lower ends of members 9 and 11 engage sections 21 and 23, respectively, of cam member 13. The position of cam member 13 as shown in FIG. 3 disposes sections 21 and 23 in their lowermost position, thereby also disposing clamp members 9 and 11 in their corresponding lowermost position of engagement whereby they serve to clamp tape 5 against bed surface 3. It is also apparent from FIG. 3 that rotation of cam member 13 in the opposite direction, whereby lever 15 is placed into engagement against stop 17, shall cause sections 21 and 23 to urge clamp members 9 and 11 upwardly. This serves to disengage clamp members 9 and 11 from tape 5, thereby permitting its addition or removal with respect to bed surface 3.

As further shown in FIG. 3, clamp members 9 and 11 are biased downwardly in their position of engagement against tape 5 by a pair of coil springs 31 and 33, respectively. Therefore, rotation of cam member 13 for the purpose of disposing clamp members 9 and 11 in a position of disengagement with respect to tape 5 shall always be achieved against the bias provided by springs 31 and 33. As seen in FIGS. 5 and 6, springs 31 and 33 are preferably provided at opposite ends of block assembly 1 within a pair of cavities 35 and 37 formed therein. The opposite ends of each spring 31 are connected to a pin 39 carried by clamp member 9 and a pin 41 carried by block assembly 1. Similarly, the opposite ends of each spring 33 are connected to a pin 43 carried by clamp member 11 and a pin 45 carried by block assembly 1. It is important to note from FIG. 6 that the configuration of cavities 35 and 37 permit the disposition of springs 31 and 33 whereby their longitudinal axes converge in a downward direction away from bed surface 3. In this way, clamp members 9 and 11 are always biased both downwardly and inwardly toward each other against bed surface 3.

An important aspect of the invention resides in the configuration and function of clamping lips 10 and 12 carried by clamp members 9 and 11, respectively. As previously shown in FIG. 1, lips 10 and 12 extend longitudinally for substantially the entire length of bed surface 3 except for the interruption defined by cutting slit 7. As more particularly shown in FIG. 6, lips 10 and 12 extend inwardly of bed surface 3 for a distance d of approximately 0.015 to 0.020 inch. Since bed surface 3 is sized so as to correspond to the width of tape 5, engagement of tape 5 by lips 10 and 12 is confined only to the narrow edge regions of tape 5 corresponding to distance d. The narrow edge regions of tape 5 clamped in this manner for substantially the entire length of bed surface 3 provides full access to tape 5 for the required splicing function since the clamped edge regions need not be accessed for the application of the splicing tab and formation of a proper splice joint. Tape 5 is therefore securely clamped in this manner to bed surface 3 and is not permitted to move during the splicing function or rise from bed surface 3. This is particularly important when very thin magnetic tape is being spliced, a procedure that may now be accurately and easily accomplished through utilization of block assembly 1.

A second embodiment of the invention shall now be described with reference to FIG. 7. In this embodiment, a pair of coil springs 47 and 49 are provided at each end of a block assembly 51 in the same basic manner previously described. However, each spring 47 is disposed in an elliptical shaped cavity 53 formed in both block assembly 51 and a corresponding clamp member 55. Similarly, each spring 49 is also disposed within an opposite elliptical shaped cavity 57 formed in both block assembly 51 and a corresponding clamp member 59. Springs 47 and 49 are placed in a state of compression by means of a pair of ball bearings 61 and 63, respectively. Bearing 61 is disposed in the terminal end of cavity 53, while bearing 63 is disposed in the terminal end of cavity 57. In this way, clamp members 55 and 59 are always urged into their downward position of engagement against tape 5. Since springs 47 and 57 are also disposed with their longitudinal axes converging in a downward direction from bed surface 3, clamp members 55 and 59 are also biased both downwardly and inwardly in the same manner previously described for the first embodiment. The embodiment shown in FIG. 7 provides an established excursion limit for clamp members 55 and 59, thereby preventing possible distension or damage to springs 47 and 49. It is preferred in this embodiment and the other embodiments described herein that the clamp members be permitted to move vertically against spring bias for a distance of approximately 0.100 inch above bed surface 3 in order to allow insertion and removal of tape 5 with respect to surface 3.

Figure 9:
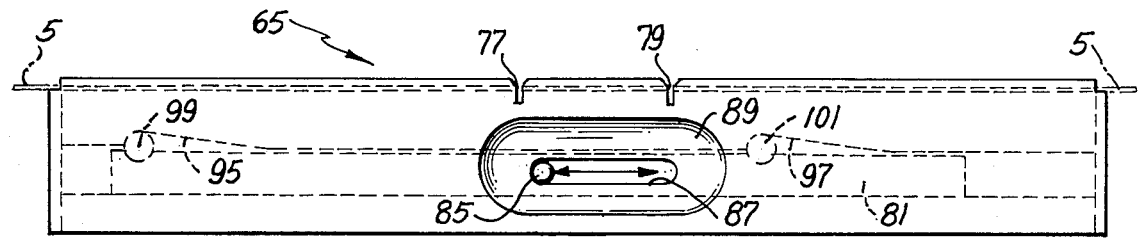
FIG. 9 is a front elevational view of the block assembly of FIG. 8.

A splicing block assembly 65 according to a third embodiment of the invention, shall now be described with initial reference to FIGS. 8 and 9. Block assembly 65 also includes a pair of longitudinally extending clamp members 67 and 69 disposed on opposite sides of a flat bed surface 71 for clamping tape 5 thereto. Clamp member 67 includes a clamping lip 73 and clamp member 69 also includes a corresponding clamping lip 75. In this embodiment, block assembly 65 is shown provided with a pair of spaced cutting slits 77 and 79, both of which extend transversely and angled with respect to the longitudinal axis of block assembly 65. It is understood that the block assembly of any embodiment disclosed herein may be provided with one or more cutting slits disposed at any desired angle deemed necessary for the intended splicing function.

Figure 10:
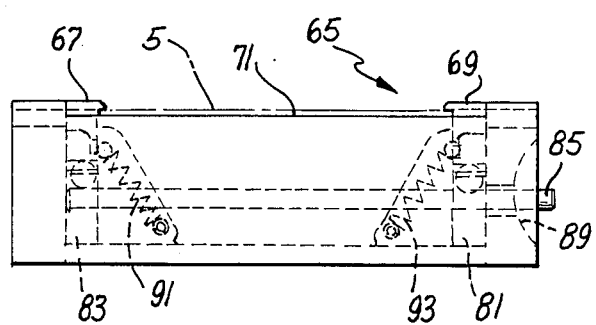
FIG. 10 is an end view of the block assembly of FIG. 8.

The raising and lowering of clamp members 67 and 69 is realized through a pair of longitudinal slides 81 and 83 carried on opposite sides of block assembly 65. As seen in FIG. 10, slide 81 is disposed directly beneath clamp member 69 and slide 83 is disposed directly beneath clamp member 67. An operating handle 85 is disposed in a slot 87 and extends transversely through block assembly 65 and connects slides 81 and 83 together for joint movement. Thus, the shifting of handle 85 back and forth across slot 87 causes the respective raising and lowering of clamp members 67 and 69 in a manner to be hereinafter described in greater detail. A recess 89 may be formed in the side of block assembly 65 around slot 87 to facilitate the manual grasping and actuation of handle 85. As also shown in FIG. 10, block assembly 65 also includes a pair of coil springs 91 and 93 disposed at both ends thereof for the purpose of biasing clamp members 67 and 69, respectively, in the same downward and inward manner as described for the previous embodiments.

The internal details of block assembly 65 shall now be described with particular reference to FIGS. 11 and 12. As seen in FIG. 11, clamp member 69 is provided with a pair of spaced inclined cam surfaces 95 and 97 which are engaged by a pair of corresponding ball bearings 99 and 101, the latter being rotatably supported within a pair of corresponding recesses 103 and 105 formed in the upper surface of slide 81. This structural arrangement is exactly the same for clamp member 67 and its associated slide 83, and is partially shown in FIG. 12 wherein clamp member 67 is seen with only a single ball bearing 107 supported in a corresponding recess 109 formed in slide 83 for engagement against an inclined cam surface 110 formed in clamp member 67. It is of course understood that slide 83 also includes another recess and corresponding ball bearing so that both cam surfaces of clamp member 67 may be engaged by ball bearings in the manner described for clamp member 69.

It is apparent from FIG. 11 that when handle 85 is disposed in its indicated position, ball bearings 99 and 101 engage the deepest portion of cam surfaces 95 and 97, thereby disposing clamp member 69 in its lowermost position of engagement against tape 5. When handle 85 is shifted towards the right, ball bearings 99 and 101 urge clamp member 69 upwardly against the bias of springs 93, thereby permitting release of tape 5. This function is exactly the same for clamp member 67 since clamp members 67 and 69 are joined for simultaneous actuation by handle 85. As shown in FIG. 12, springs 91 and 93 are disposed within a pair of corresponding cavities 111 and 113 provided at both ends of block assembly 65. The opposite ends of springs 91 and 93 are connected to their corresponding clamp members 67 and 69, and block assembly 65 in the same manner previously described for the first embodiment. In this way, clamp members 67 and 69 are provided with the same bias force in both downward and inward directions.

Referring now to FIG. 13, there is shown a tape 5 provided with a spliced joint formed by the splicing block assembly of the present invention. As seen, the edges of tab 115 in the longitudinal direction of tape 5 are inwardly spaced by the distance d, representing approximately 0.015 to 0.020 inch, from the outer edges of tape 5. These narrow edge regions represent the portions of the tape clamped by the inwardly directed longitudinal lips of the clamp members, the access to which is not required for the formation of a proper splice joint.

It is to be understood that the embodiments of the invention herein shown and described are to be taken as preferred examples of the same, and that various changes in shape, size and arrangement of parts may be resorted to without departing from the spirit of the invention or scope of the subjoined claims.

I claim:

1. An improved tape splicing block assembly comprising:
    (a) a block member defined in part by a longitudinal flat bed surface for supporting a length of tape thereon;
    (b) a pair of releasable clamp members carried by the block member and disposable between a first position for clamping the tape to the bed surface and a second position for permitting removal or insertion of the tape with respect to the bed surface;
    (c) means carried by the clamp members for clamping substantially continuous inwardly disposed regions of the tape edges along substantially the length of the bed surface, whereby the entire length of tape on the bed surface may be securely clamped thereto while permitting sufficient access to the tape for completing a proper splice joint; and
    (d) means for disposing the clamp members between the first and second positions.

2. The block assembly of claim 1 wherein the means for clamping the inwardly disposed regions of the tape edges include a clamping lip carried by each clamp member, each clamping lip extending inwardly of the bed surface and longitudinally for substantially the entire length thereof.

3. The block assembly of claim 2 wherein each clamping lip extends inwardly of the bed surface for approximately 0.015 to 0.020 inch.

4. The block assembly of claim 1 wherein the means for disposing the clamp members in the first and second positions includes a camming means for lowering the clamp members into the first position and raising the clamp members into the second position, and resilient means for biasing the clamp members downwardly and inwardly towards the bed surface.

5. The block assembly of claim 4 wherein the resilient means includes at least one pair of coil springs, each spring being connected to a corresponding clamp member and the block member wherein the longitudinal axes of the springs converge in a direction away from the bed surface.

6. The block assembly of claim 4 further including a pair of elliptical cavities formed in each clamp member and the block member, and the resilient means includes a ball bearing and a coil spring disposed within each cavity.

7. The block assembly of claim 4 wherein the camming means includes a rotatable cylindrical cam member provided with a pair of spaced eccentric sections for engaging the clamp members, whereby rotation of the cam member in opposite directions disposes the clamp members between the first and second positions.

8. The block assembly of claim 4 wherein the camming means includes a pair of longitudinal slides, at least one inclined cam surface formed in each clamp member, at least one ball bearing carried by each slide for engaging a corresponding clamp surface, and a handle joining the slides to permit their simultaneous longitudinal movement in opposite direction for disposing the cam members between the first and second positions.

* * * * *